US009317780B2

(12) United States Patent
Bala et al.

(10) Patent No.: US 9,317,780 B2
(45) Date of Patent: Apr. 19, 2016

(54) DETECTING MULTI-OBJECT ANOMALIES UTILIZING A LOW RANK SPARSITY MODEL (71) Applicant: Xerox Corporation, Norwalk, CT (US)

(72) Inventors: Raja Bala, Pittsford, NY (US); Zhigang Fan, Webster, NY (US); Aaron Burry, Ontario, NY (US); Vishal Monga, State College, PA (US); Xuan Mo, State College, PA (US)

(73) Assignees: Xerox Corporation, Norwalk, CT (US); The Penn State Research Foundation, University Park, PA (US)

( * ) Notice: Subject to any disclaimer, the term of this patent is extended or adjusted under 35 U.S.C. 154(b) by 7 days.

(21) Appl. No.: 14/326,635

(22) Filed: Jul. 9, 2014

(65) Prior Publication Data

US 2015/0110357 A1 Apr. 23, 2015

Related U.S. Application Data (60) Provisional application No. 61/892,149, filed on Oct. 17, 2013.

(51) Int. Cl.
*G06K 9/00* (2006.01)
*G06K 9/62* (2006.01)

(52) U.S. Cl.
CPC .......... *G06K 9/6249* (2013.01); *G06K 9/00771* (2013.01)

(58) Field of Classification Search
None
See application file for complete search history.

(56) References Cited

U.S. PATENT DOCUMENTS

| 8,165,215 B2* | 4/2012 | Aharon | G06K 9/6249 375/240.22 |
| 2013/0286208 A1 | 10/2013 | Bala et al. | |
| 2014/0232862 A1* | 8/2014 | Bala | G06K 9/6256 348/143 |

OTHER PUBLICATIONS

Chen, Yi, Nasser M. Nasrabadi, and Trac D. Tran. "Simultaneous joint sparsity model for target detection in hyperspectral imagery." Geoscience and Remote Sensing Letters, IEEE 8.4 (2011): 676-680.*
Candes, E. J. et al., "Robust Principal Component Analysis?" J. ACM (2011) 58(3):11:1-11:37.
Chandrasekaran, V. et al., "Rank-Sparsity Incoherence for Matrix Decomposition," SIAM J. Optim. (2011) 21(2):572-596.

(Continued)

*Primary Examiner* — Shefali Goradia
(74) *Attorney, Agent, or Firm* — Kermit D. Lopez; Luis M. Ortiz; Ortiz & Lopez, PLLC (57) ABSTRACT Methods and systems for detecting anomalies in transportation related video footage. In an offline training phase, receiving video footage of a traffic location can be received. Also, in an offline training phase, event encodings can be extracted from the video footage and collected or compiled into a training dictionary. One or more input video sequences captured at the traffic location or a similar traffic location can be received in an online detection phase. Then, an event encoding corresponding to the input video sequence can be extracted. The event encoding can be reconstructed with a low rank sparsity prior model applied with respect to the training dictionary. The reconstruction error between actual and reconstructed event encodings can then be computed in order to determine if an event thereof is anomalous by comparing the reconstruction error with a threshold.

18 Claims, 6 Drawing Sheets (56) References Cited

OTHER PUBLICATIONS

Fu, Z. et al., "Similarity Based Vehicle Trajectory Clustering and Anomaly Detection," IEEE International Conference on Image Processing (ICIP'05) (2005) 2:602-605.

Hu, W. et al., "A Survey on Visual Surveillance of Object Motion and Behaviors," IEEE Transactions on Systems, Man, and Cybernetics—Part C: Applications and Reviews (2004) 34(3):334-352.

Junejo, I. N. et al., "Multi Feature Path Modeling for Video Surveillance." Proceedings of the 17th International Conference on Pattern Recognition (ICPR'04) 2:716-719.

Li, C. et al., "Abnormal Behavior Detection via Sparse Reconstraction Analysis of Trajectory," 2011 Sixth International Conference on Image and Graphics (2011) pp. 807-810.

Piciarelli, C. et al., "Trajectory-Based Anomalous Event Detection," IEEE Transactions on Circuits and Systems for Video Technology, (2008) 18(11):1544-1554.

Recht, B. et al., "Guaranteed Minimum-Rank Solutions of Linear Matrix Equations via Nuclear Norm Minimization,"SIAM Review (2010) 52(3):471-501.

Saligrama, V. et al., "Video Anomaly Identification," IEEE Signal Processing (2010) 27(5)18-33.

Wright, J. et al., "Robust Face Recognition via Sparse Representation," IEEE Transactions on Pattern Analysis and Machine Intelligence (2009) 31(2):210-227.

Yilmaz, A. et al., "Object Tracking: A Survey," ACM Comput. Surv. (2006) 38(4):Article 13, 45 pages.

* cited by examiner

DETECTING MULTI-OBJECT ANOMALIES UTILIZING A LOW RANK SPARSITY MODEL

CROSS-REFERENCE TO PROVISIONAL APPLICATION

This application claims priority under 35 U.S.C. 119(e) to U.S. Provisional Patent Application Ser. No. 61/892,149, entitled "Low Rank Sparsity Prior for Video Anomaly Detection," which was filed on Oct. 17, 2013, the disclosure of which is incorporated herein by reference in its entirety.

FIELD OF THE INVENTION

Embodiments are generally related to the management of traffic systems. Embodiments are also related to video-based surveillance. Embodiments are additionally related to the detection of anomalies at traffic intersections for use in managing traffic. Embodiments are further related to low-rank approximation techniques.

BACKGROUND

With the increased demand for security and safety, video-based surveillance systems are being employed in a variety of rural and urban locations. A vast amount of video footage, for example, can be collected and analyzed for traffic violations, accidents, crime, terrorism, vandalism, and other suspicious activities. Because manual analysis of such large volumes of data is prohibitively costly, a pressing need exists for developing effective software tools that can aid in the automatic or semi-automatic interpretation and analysis of video data for surveillance, law enforcement, and traffic control and management.

Figure 1:
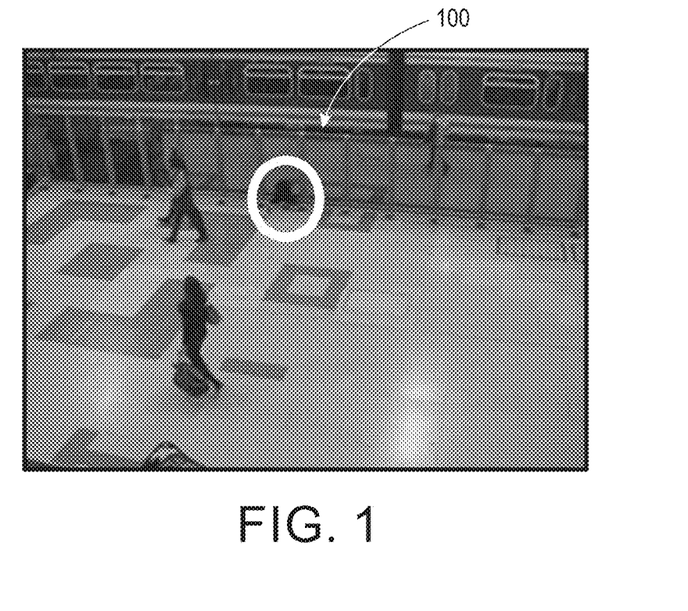
FIGS. 1-2 illustrate an exemplary view of transportation related anomalies.
Figure 2:
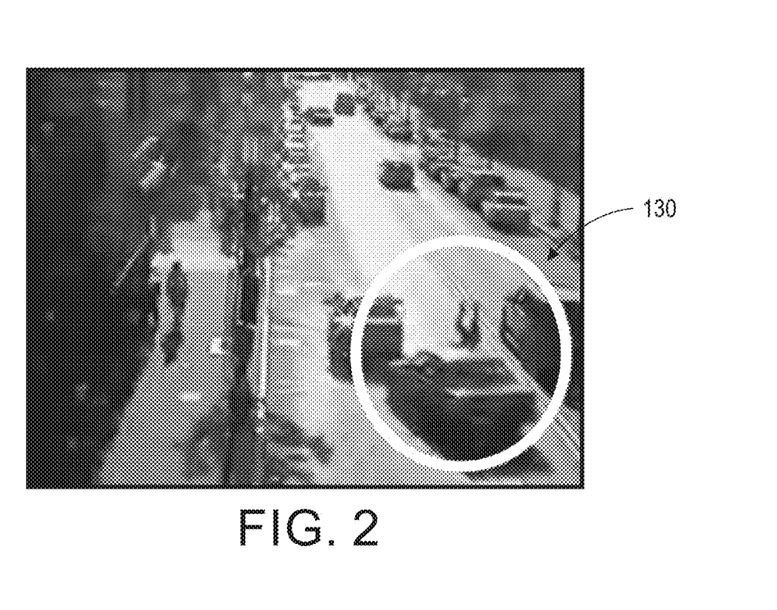

Video-based anomaly detection refers to the problem of identifying patterns in data that do not conform to expected behavior, and which may warrant special attention or action. The detection of anomalies in a transportation domain can include, for example, traffic violations, unsafe driver/pedestrian behavior, accidents, etc. FIGS. 1-2 illustrate pictorial views of exemplary transportation related anomalies captured from, for example, video monitoring cameras. In the scenario depicted in FIG. 1, unattended baggage 100 is shown and identified by a circle. In the example shown in FIG. 2, a vehicle is depicted approaching a pedestrian 130. Both the vehicle and pedestrian 130 are shown surrounded by a circle.

A number of anomalies can be generated by a typical trajectory/behavior of a single object and collective anomalies can be caused by joint observation of the objects. For example, in the area of transportation, accidents at traffic intersections are indeed based on joint and not just individual object behavior. Also, it is possible that the individual object behaviors are not anomalous when studied in isolation, but in combination produce an anomalous event. For example, a vehicle that comes to a stop at a pedestrian crossing before proceeding is a result of the car colliding with, or coming in very close proximity with the crossing pedestrian.

Several approaches have been proposed to detect the traffic-related anomalies based on an object tracking technique. In one prior art approach, nominal vehicle paths or trajectories can be derived and deviations thereof can be searched in a live traffic video data. The vehicle is tracked and its path is compared against nominal classes during a test or evaluation phase. A statistically significant deviation from all classes indicates an anomalous path. A problem associated with such approach is that an abnormal pattern in realistic scenarios involving multiple object trajectories in the presence of occlusions, clutter, and other background noise are not detected. Also, the algorithms are not computationally simple enough to detect the anomalies in quasi-real-time.

Another approach involves the use of a sparse reconstruction model to solve the classification problem and subsequently for anomaly detection. For example, a normal and/or usual event in a video footage can be extracted and categorized into a set of nominal event classes in a training step. The categorization is based on a set of n-dimensional feature vectors extracted from the video data and can be performed manually or automatically. The parametric representations of vehicle trajectories can be chosen as features and any new nominal sample can be explained by a linear combination of samples within one of the nominal classes.

The training samples from the i-th class can be arranged as columns of a matrix $A_i \in \mathbb{R}^{n \times T}$. A dictionary $A \in \mathbb{R}^{n \times KT}$ with respect to the training samples from all K classes can then be formed as follows: $A=[A_1, A_2, \ldots, A_K]$. A test image $y \in \mathbb{R}^n$ from a similar class is conjectured to approximately lie in a linear span of those training samples for given sufficient training samples from the m-th trajectory class. Any input trajectory feature vector may hence be represented by a sparse linear combination of the set of all training trajectory samples as shown below in equation (1):

$$y = A\alpha = [A_1, A_2, \ldots, A_K] \begin{bmatrix} \alpha_1 \\ \alpha_2 \\ \vdots \\ \alpha_K \end{bmatrix} \quad (1)$$

where each $\alpha_i \in \mathbb{R}^T$. Typically for a given trajectory y, only one of the $a_i$'s is active (corresponding to the class/event that y is generated from), thus the coefficient vector $\alpha \in \mathbb{R}^{KT}$ is modeled as being sparse and is recovered by solving the following optimization problem:

$$\hat{\alpha} = \underset{\alpha}{\operatorname{argmin}} \|\alpha\|_1 \text{ subject to } \|y - A\alpha\|_2 < \varepsilon \quad (2)$$

where the objective is to minimize the number of non-zero elements in a. It is well-known from the compressed sensing literature that utilizing the $I_0$ norm leads to a NP-hard (non-deterministic polynomial-time hard) problem. Thus, the $I_1$ norm can be employed as an effective approximation. A residual error between the test trajectory and each class behavior pattern can be computed as shown in equation (3) to determine a class to which the test trajectory belongs:

$$r_i(y) = \|y - A_i \hat{\alpha}_i\|_2 \; i=1,2,\ldots,K \quad (3)$$

If anomalies have been predefined into their own class, then the classification task also accomplishes anomaly detection. Alternatively, if all training classes correspond to only normal events, then anomalies can be identified via outlier detection. To this end, an index of sparsity can be defined and utilized to measure the sparsity of the reconstructed a:

$$SCI(\alpha) = \frac{K \cdot \max_i \|\delta_i(\alpha)\|_1 / \|\alpha\|_1 - 1}{K - 1} \in [0, 1] \quad (4)$$

where $\delta_i(\alpha): \mathbb{R}^T \rightarrow \mathbb{R}^T$ the characteristic function that selects the coefficients $a_i$ with respect to the i-th class. The normal samples are likely to exhibit a high level of sparsity, and conversely, anomalous samples likely produce a low sparsity index. A threshold on SCI(a) determines whether or not the sample is anomalous. Such sparsity based framework for classification and anomaly detection is robust against various distortions, notably occlusion and is robust with respect to the particular features chosen, provided the sparse representation is computed correctly.

However, such an approach does not take into account joint anomalies involving multiple objects and does not capture the interactions required to detect these types of multi-object anomalies. To address this issue, a joint sparsity model can be employed to detect anomalies involving co-occurrence of two or more events. The joint sparsity model solves for the sparse coefficients via the optimization problem. An example of the optimization problem and the joint sparsity model is discussed in U.S. patent application Ser. No. 13/476,239, entitled "Method and System for Automatically Detecting Multi-Object Anomalies Utilizing Joint Sparse Reconstruction Model," which is is incorporated herein by reference in its entirety. The optimization problem can be expressed as, for example:

$$\text{minimize } \|J(H \circ S)\|_{row,0}$$

$$\text{subject to } \|Y-AS\|_F < \epsilon \quad (5)$$

This anomaly detection technique based on the sparsity model is particularly robust against various distortions, notably occlusion, and identifies anomalies with high accuracy rates. The model, however, relies upon a certain structure wherein there exists a rigid object correspondence between the training dictionary A and the test trajectories Y. Furthermore, one needs to know whether a given anomaly involves a single object or P>1 objects. In the case of the latter, it is necessary to know how many objects are involved in an event (i.e., what is P) in order to trigger the appropriate training dictionary, constructed separately for each value of P.

In real world scenarios, events are sometimes difficult to be grouped into either single- or multi-object events even as trajectory data corresponding to each object (whether observed independently or jointly at the same time instant) becomes available in real time. This is feasible in a structured scenario such as a stop sign or a traffic intersection, where events commonly involve a certain number of objects. However, the approach becomes unrealistic in more general transportation scenarios (e.g., a busy airport or parking lot) where object motion is unrestricted and does not exhibit repeated patterns making it difficult to form associations of objects in training videos to those in the test videos. Furthermore, equation (2) and its extension for multi-object anomaly detection are expensive from the viewpoint of computation and partially stems from the fact that they correspond to a non-convex optimization problem.

Figure 3:
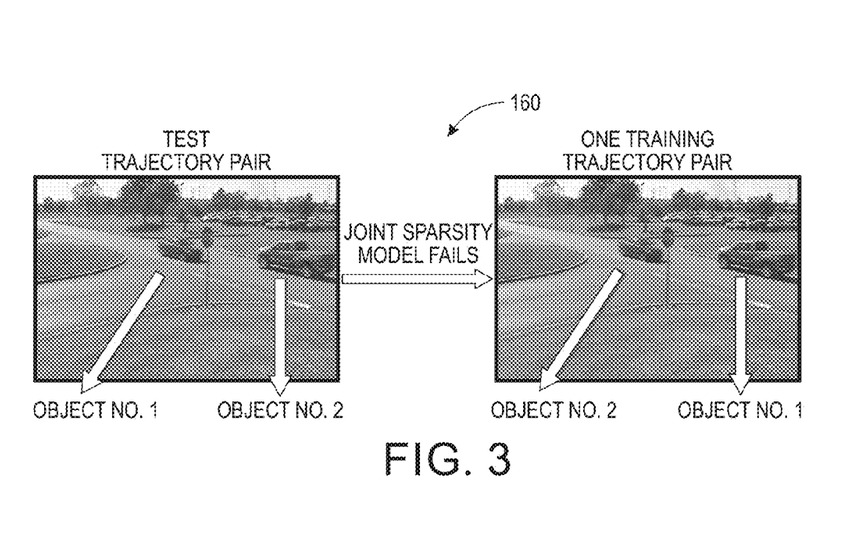
FIG. 3 illustrates an example wherein the joint sparsity model may fail if the order of test trajectories is different from that of the training trajectories.
Figure 4:
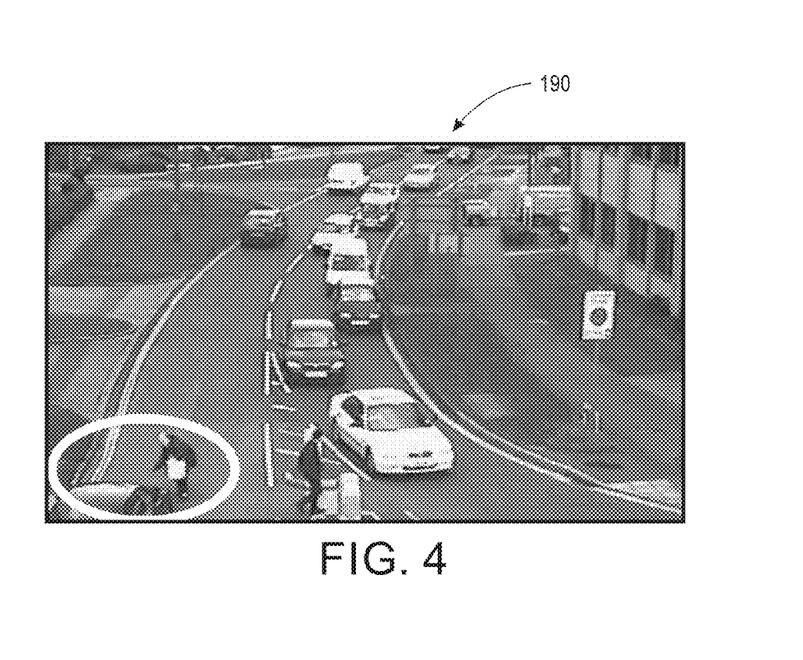
FIG. 4 illustrate a video frame with respect to a crowded traffic.

FIG. 3 represents an example wherein the joint sparsity model may fail if the order of test trajectories is different from that of the training trajectories. Another example of a video frame with crowded unstructured traffic patterns is shown in FIG. 4. It is not known if the trajectory of the pedestrian should be analyzed as a single event or joint event. In summary, previous formulations of the sparsity model and the joint sparsity model are suitable for solving only the structured scenario where it is feasible to readily determine the number and sequence of objects involved in the events.

Based on the foregoing, it is believed that a need exists for an improved method and system for detecting single- and multi-object anomalies in an unstructured scenario where the number and sequence of objects in an event are not known or easily obtainable. The proposed method and system is based on a low rank sparsity prior model, as will be described in greater detailed herein.

SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide methods and systems for detecting anomalies in transportation related video footage.

It is another aspect of the disclosed embodiments to provide for improved video surveillance for use in traffic management.

The aforementioned aspects and other objectives and advantages can now be achieved as described herein. Methods and systems for detecting anomalies in transportation related video footage are disclosed. In an offline training phase, receiving video footage of a traffic location can be received. Also, in an offline training phase, event encodings can be extracted from the video footage and collected or compiled into a training dictionary. One or more input video sequences captured at the traffic location or a similar traffic location can be received in an online detection phase. Then, an event encoding corresponding to the input video sequence can be extracted. The event encoding can be reconstructed with a low rank sparsity prior model applied with respect to the training dictionary. The reconstruction error between actual and reconstructed event encodings can then be computed in order to determine if an event thereof is anomalous by comparing the reconstruction error with a threshold.

BRIEF DESCRIPTION OF THE FIGURES

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the present invention can be embodied as a method, data processing system, or computer program product. Accordingly, the present invention may take the form of an entire hardware embodiment, an entire software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, USB Flash Drives, DVDs, CD-ROMs, optical storage devices, magnetic storage devices, etc.

Computer program code for carrying out operations of the present invention may be written in an object oriented programming language (e.g., Java, C++, etc.). The computer program code, however, for carrying out operations of the present invention may also be written in conventional procedural programming languages, such as the "C" programming language or in a visually oriented programming environment, such as, for example, Visual Basic.

The program code may execute entirely on the user's computer, partly on the user's computer, as a stand-alone software package, partly on the user's computer and partly on a remote computer or entirely on the remote computer. In the latter scenario, the remote computer may be connected to a user's computer through a local area network (LAN) or a wide area network (WAN), wireless data network e.g., WiFi, Wimax, 802.xx, and cellular network or the connection may be made to an external computer via most third party supported networks (for example, through the Internet utilizing an Internet Service Provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 5:
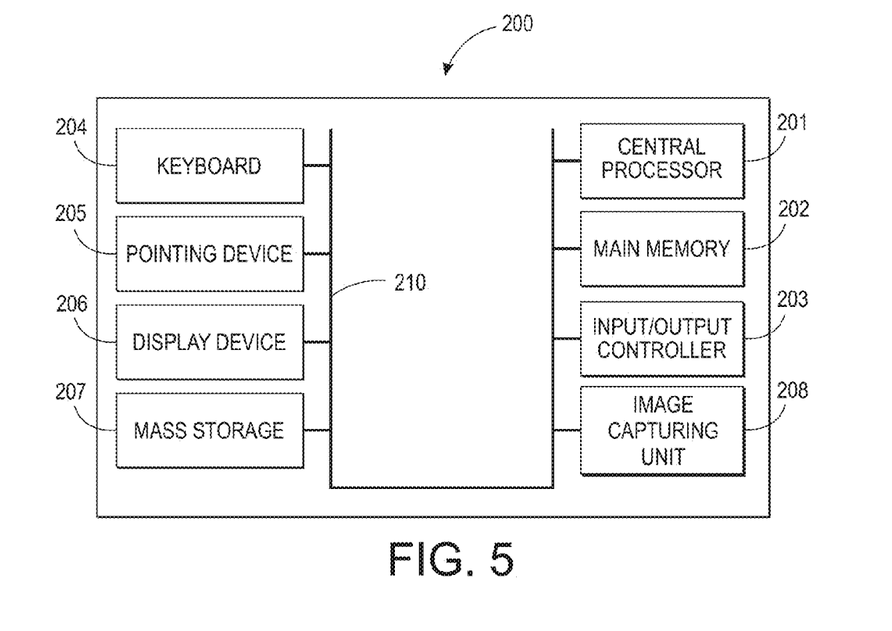
FIG. 5 illustrates a schematic view of a computer system, in accordance with an embodiment.
Figure 6:
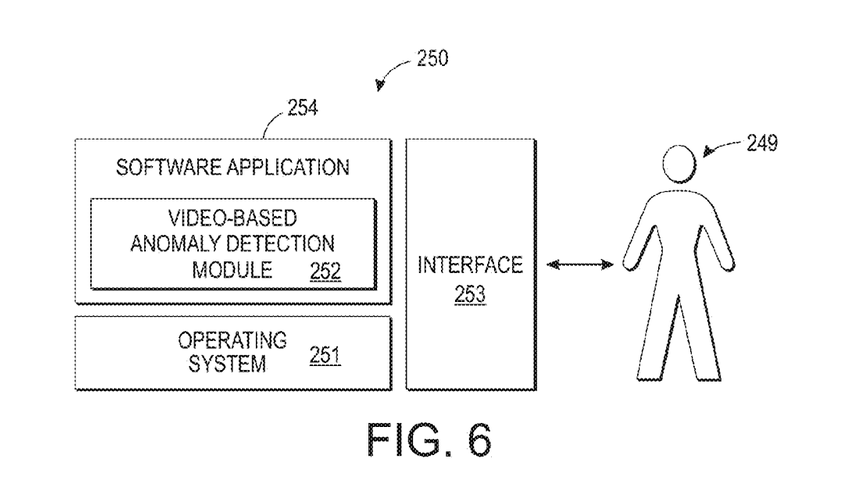
FIG. 6 illustrates a schematic view of a software system including a video-based multi-object anomalies detection module, an operating system, and a user interface, in accordance with an embodiment.

FIGS. 5-6 are provided as exemplary diagrams of data-processing environments in which embodiments of the present invention may be implemented. It should be appreciated that FIGS. 5-6 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 5, the disclosed embodiments may be implemented in the context of a data-processing system 200 that includes, for example, a central processor 201, a main memory 202, an input/output controller 203, a keyboard 204, an input device 205 (e.g., a pointing device, such as a mouse, track ball, and pen device, etc.), a display device 206, a mass storage 207 (e.g., a hard disk), an image capturing unit 208, and a USB (Universal Serial Bus) peripheral connection. As illustrated, the various components of data-processing system 200 can communicate electronically through a system bus 210 or similar architecture. The system bus 210 may be, for example, a subsystem that transfers data between, for example, computer components within data-processing system 200 or to and from other data-processing devices, components, computers, etc.

FIG. 6 illustrates a computer software system 250 for directing the operation of the data-processing system 200 depicted in FIG. 5. Software application 254, stored in main memory 202 and on mass storage 207, generally includes a kernel or operating system 251 and a shell or interface 253. One or more application programs, such as software application 254, may be "loaded" (i.e., transferred from mass storage 207 into the main memory 202) for execution by the data-processing system 200. The data-processing system 200 receives user commands and data through user interface 253; these inputs may then be acted upon by the data-processing system 200 in accordance with instructions from operating system 251 and/or software application 254.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" constitutes a software application.

Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application, such as a computer program designed to assist in the performance of a specific task, such as word processing, accounting, inventory management, etc.

The interface 253, which is preferably a graphical user interface (GUI), also serves to display results, whereupon the user may supply additional inputs or terminate the session. In an example embodiment, operating system 251 and interface 253 can be implemented in the context of a "Windows" system. It can be appreciated, of course, that other types of systems are possible. For example, rather than a traditional "Windows" system, other operation systems such as, for example, Linux may also be employed with respect to operating system 251 and interface 253. The software application 254 can include a video-based multi-object anomaly detection module 252 for detecting anomalies in transportation video footage based on a low rank sparsity prior model 320. Software application 254, on the other hand, can include instructions such as the various operations described herein with respect to the various components and modules described herein, and, for example, the instructions or operations shown in blocks 410, 420, 432, 440, and 450 of method 400 depicted in FIG. 8.

FIGS. 5-6 are thus intended as examples and not as architectural limitations of disclosed embodiments. Additionally, such embodiments are not limited to any particular application or computing or data-processing environment. Instead, those skilled in the art will appreciate that the disclosed approach may be advantageously applied to a variety of systems and application software. Moreover, the disclosed embodiments can be embodied on a variety of different computing platforms, including Macintosh, UNIX, LINUX, and the like.

Figure 7:
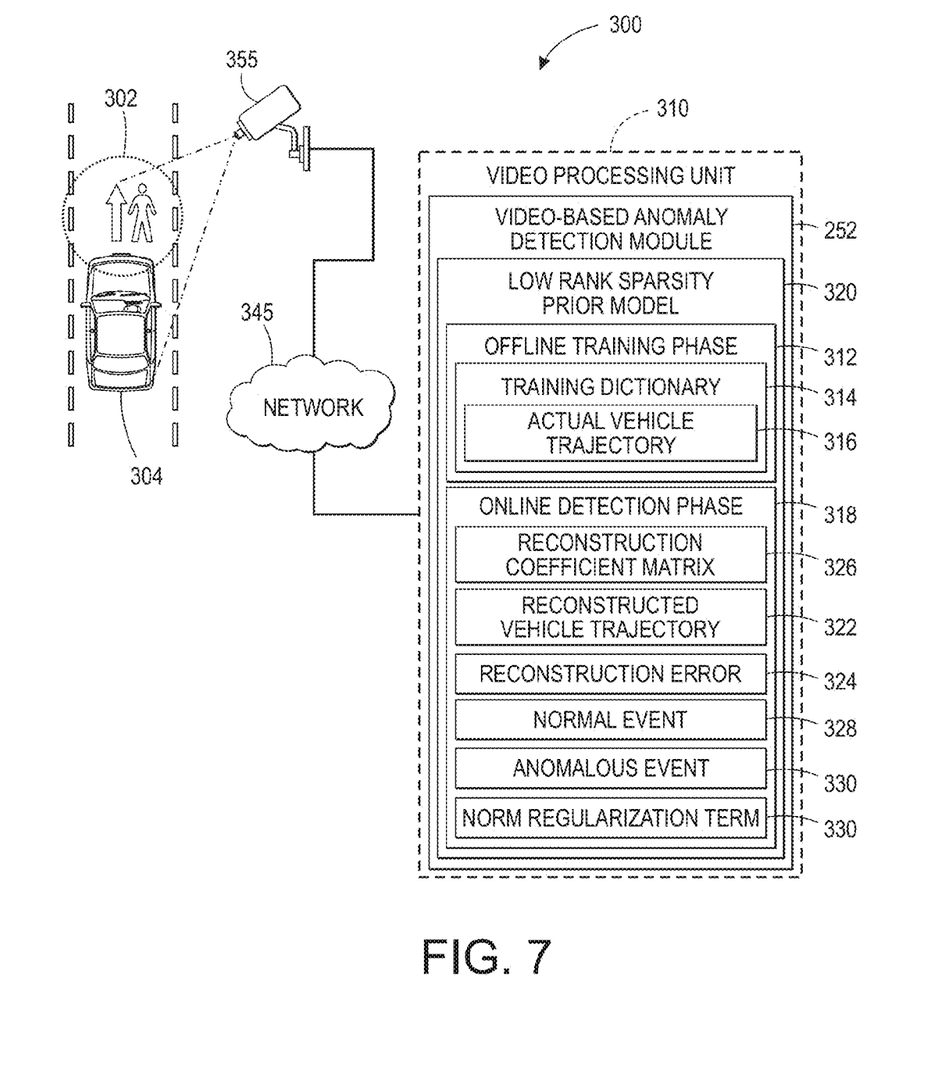
FIG. 7 illustrates a block diagram of a video-based anomaly detection system based on a low rank sparsity prior model, in accordance with a preferred embodiment.

FIG. 7 illustrates a block diagram of a video-based single-object or multi-objects anomaly detection system 300 based on the low rank sparsity prior model 320, in accordance with a preferred embodiment. It can be appreciated that the events discussed herein may be single-object or multi-object anomalies. Note that in FIGS. 5-9, identical or similar parts or elements are generally indicated by identical reference numeral. The video-based anomaly detection system 300 shown in FIG. 7 can detect, for example, collective anomalies 302, which may be caused by the joint observation of objects from a video footage to identify unsafe driver/pedestrian behavior, accidents, traffic violations, suspicious activity, etc.

Detection system 300 detects abnormal patterns 302 in scenarios wherein, for example, multiple vehicles potentially move along complex trajectories and in the presence of clutter and other background noise and occlusion.

The video-based anomaly detection system 300 can be configured to include, for example, an image capturing unit 355 (e.g., video camera) for capturing an image (or images/video) of a vehicle 304 in motion within an effective field of view. The image capturing unit 355 can be operatively connected to, for example, a video processing unit 310 via a network 345. Note that the image capturing unit 355 described herein is analogous or similar to the image capturing unit 208 of the data-processing system 200, depicted in FIG. 5. In some embodiments, the image-capturing unit 355 can include built-in integrated functions such as image processing, data formatting, and data compression functions.

Note that the network 345 may employ any network topology, transmission medium, or network protocol. The network 345 may include connections such as wire, wireless communication links, or fiber optic cables. Network 345 can be, for example, the Internet representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, government, educational, and other computer systems that route data and messages.

The video-based anomaly detection system 300 can include the video-based multi-object anomalies detection module 252 for automatically detecting the multi-object anomalies 302 at a traffic intersection. The video-based multi-object anomalies detection module 252 further includes an offline training unit 312 and an online detection unit 318 associated with the low rank sparsity prior model 320. It can be appreciated that the offline training unit 312 and the online detection unit 318 can be implemented as software modules.

The video-based anomaly detection module 252 is configured to extract and collect a vehicle trajectory 316 corresponding to a first video sequence at a first traffic event into a training dictionary 314 suitable for the low rank sparsity prior model 320 in the offline training unit 312. The video-based multi-object anomalies detection module 252 further receives a second input video sequence captured at a second traffic event similar to the first traffic event in the online detection phase 318. The module 252 extracts and reconstructs a trajectory 322 utilizing the low rank sparsity prior model 320 applied with respect to the training dictionary 314. The low rank sparsity prior model 320 simultaneously minimizes rank and maximizes sparsity of a reconstruction coefficient matrix 326 by solving a constrained convex optimization problem.

The module 252 can compute a reconstruction error 324 between the actual and reconstructed vehicle trajectories 316 and 322 and the reconstruction error 324 can be compared with a threshold to determine whether an event is anomalous 330. The system 300 imposes less restriction on the structure of the training dictionary and run time execution is much faster than that of the standard sparse reconstruction approach.

Figure 8:
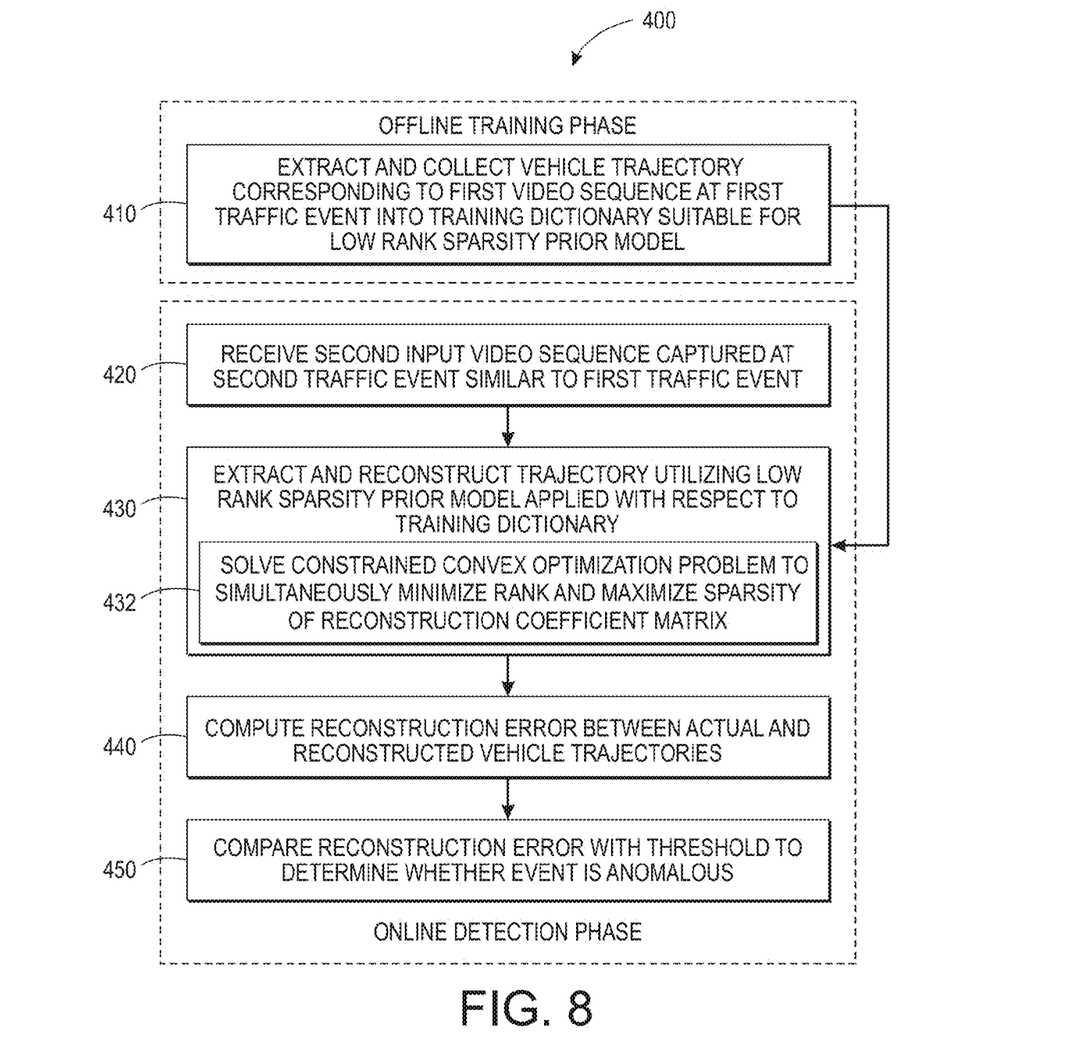
FIG. 8 illustrates a high level flow chart of operations illustrating logical operational steps of a method for detecting single-object or multi-object anomalies utilizing the low rank sparsity prior model, in accordance with an alternative embodiment.

FIG. 8 illustrates a high level flow chart of operations illustrating logical operational steps of a method 400 for detecting single-object or multi-object anomalies utilizing the rank sparsity prior model 320, in accordance with an alternative example embodiment. Initially, as indicated at block 410, the vehicle trajectory 316 corresponding to the first video sequence at the first traffic event can be extracted and collected into the training dictionary 314 suitable for the low rank sparsity prior model 320 in the offline training phase 312. The second input video sequence captured at the second traffic event similar to the first traffic event can be received in the online detection phase 318, as illustrated at block 420.

The trajectory 322 can be extracted and reconstructed utilizing the low rank sparsity model 320 applied with respect to the training dictionary 314, as indicated at block 430. Note that within block 430, a secondary operation is indicated at block 432, which is a specific elaboration of the operation depicted at 430. That is, the operation shown at block 432 may form a part of the operation of block 430 or may be left out. Thus, as shown at block 432, the low rank sparsity model can be formulated in terms of a constrained convex optimization problem solved to simultaneously minimize rank and maximize sparsity of the reconstruction coefficient matrix 326 utilizing the low rank sparsity prior model 320.

Thereafter, as indicated at block 440 and 450, steps or logical operations can be implemented in which reconstruction error 324 between the actual and reconstructed vehicle trajectories 316 and 322 is computed and the reconstruction error 324 compared with the threshold to determine whether an event is anomalous 330.

Specifically, anomaly detection can be accomplished by collecting M input events within a certain time range into a matrix $Y=\{y_i\} \in \mathbb{R}^{N \times M}$. For example, events could be trajectories of moving objects. The training dictionary $A \in \mathbb{R}^{N \times T}$ includes events corresponding to single and multiple objects. The order of the training samples can be arbitrary. For the given event matrix Y, the coefficient matrix $S \in \mathbb{R}^{T \times M}$ is solved for assuming the linear model Y=AS.

For normal events, Y is expected to be sparse given a sufficient number of training samples. However, since the structure of the dictionary, and hence the sparse structure of S, is not known ahead of time, the well-known $I_0$ norm, $I_1$ norm or $\|\cdot\|_{row,0}$ to measure and maximize the sparsity of s cannot be employed. The key observation behind the invention is that a sparse matrix will, with high probability, also exhibit low rank. Therefore, rank can be utilized to measure sparsity, and S could be obtained from the solution of:

$$\text{minimize rank}(S)$$

$$\text{subject to } \|Y-AS\|_F \le \epsilon \quad (6)$$

The term rank(S) can be intractable. Therefore, this problem can be relaxed into a convex problem by approximating rank(S) to be $\|S\|_* = \Sigma_i \sigma_i(S)$ (where $\|\cdot\|_*$ denotes nuclear norm and $\sigma_i(S)$ is the i-th singular value of (S). The optimization in Equation (6) now becomes a convex problem:

$$\text{minimize } \|S\|_*$$

$$\text{subject to } \|Y-AS\|_F \le \epsilon \quad (7)$$

However, low rank does not ensure sparsity, in fact:

sparse matrix $\ne$ low rank matrix

The following two simple matrices illustrate this statement:

$$\begin{bmatrix} 1 & 0 & 0 & 0 \\ 0 & 1 & 0 & 0 \\ 0 & 0 & 1 & 0 \\ 0 & 0 & 0 & 1 \end{bmatrix}$$

Sparse but not low rank $$\begin{bmatrix} 1 & 1 & 1 & 1 \\ 1 & 1 & 1 & 1 \\ 1 & 1 & 1 & 1 \\ 1 & 1 & 1 & 1 \end{bmatrix}$$

Low rank but not sparse

Therefore, in order to ensure sparsity in Equation (7), a $l_1$ norm regularization term 330 can be added into the cost function while still preserving convexity:

$$\text{minimize } \|S\|_* + \lambda \|S\|_1$$

$$\text{subject to } \|Y-AS\|_F \le \epsilon \quad (8)$$

Nuclear norm minimization subject to linear constraints is a well-known problem; but, because of a quadratic constraint $\|Y-AS\|_F \le \epsilon$, this problem requires a different solution. In the preferred embodiment, a semi-definite programming methodology is used to solve for Equation (8). Once the optimal coefficient matrix $\hat{S}$ is known, the recovered trajectory can be computed utilizing columns of $\hat{S}=(\hat{s}_1, \hat{s}_2, \ldots, \hat{s}_M)$:

$$\hat{y}_i = A\hat{s}_i \quad (9)$$

Those test trajectories that are very similar to the recovered trajectories can be regarded as normal events 328.

$$\frac{\|y_i - \hat{y}_i\|_2}{\|y_i\|_2} < \tau \to y_i \text{ is deemed normal} \quad (10)$$

Remaining trajectories for which recovered trajectories are very different from actual trajectories are regarded as anomalous.

One important quantity in Equation (8) that must be determined is the regularization parameter $\lambda$ which can be employed to determine the relative weight between $\|\cdot\|_0$ and $\|\cdot\|_1$. This parameter can be determined by sweeping across a range of $\lambda$ values and determining anomaly detection rates using n-fold cross-validation techniques. The value of $\lambda$ is picked that maximizes the detection rate.

Figure 9:
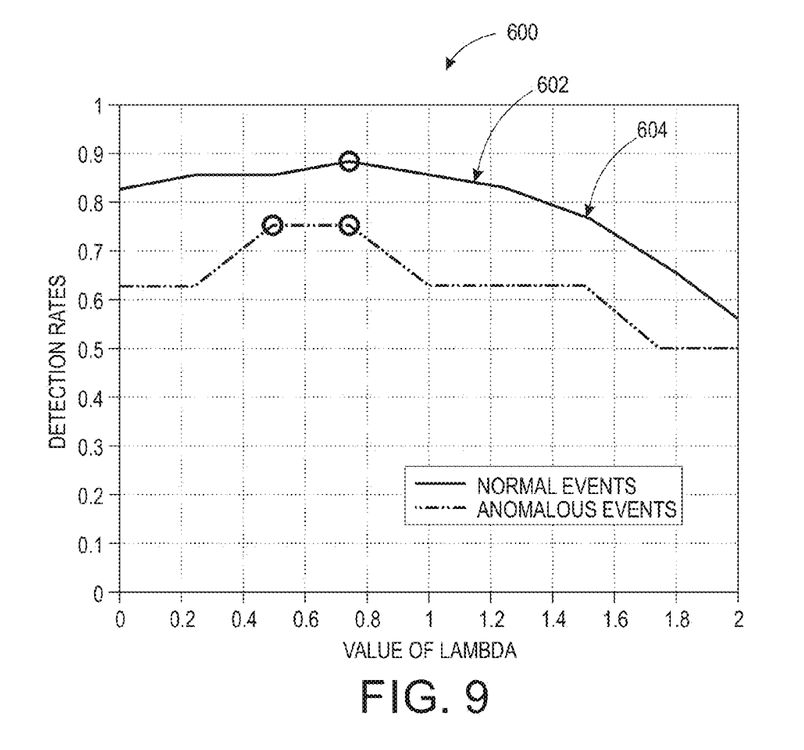
FIG. 9 illustrates a graph depicting a detection rate curve, in accordance with the disclosed embodiments.

FIG. 9 illustrates a graph 600 depicting anomaly detection rates curves, in accordance with an embodiment. Graph 600 shown in FIG. 9 illustrates example detection rates curves with respect to $\lambda$ for a set of experimental video events captured at a stop sign intersection. A value of $\lambda \approx 0.75$ is optimal for this data set. Examples of normal detection rates are indicated by a solid line in graph 600. Anomalous events are indicated by dashed line of graph 600.

TABLE 1 shown below represents the execution time and confusion matrices of low rank sparsity prior model 320 and sparsity model for a set of experimental data. It can be observed that the disclosed low rank sparsity prior model 320 runs much faster than the sparsity model with only a little loss in detection rates.

TABLE 1

| | Low rank sparsity prior | | Sparsity model | |
|---|---|---|---|---|
| | Running time | | | |
| | 37 seconds | | 159 seconds | |
| | Normal | Anomaly | Normal | Anomaly |
| Normal | 88.2% | 25.0% | 91.2% | 25.0% |
| Anomaly | 11.8% | 75.0% | 8.8% | 75.0% |

The low rank sparsity prior model 320 is more practical and requires less effort in building the training dictionary. The low rank sparsity prior model 320 also requires a lower computational complexity at run-time and imposes less restriction on the structure of the training dictionary, thus making its generation much more efficient and convenient. The results indicate a significant gain in run time speed with modest loss in detection accuracy. Embodiments are readily detected via the significant performance speedup.

Based on the foregoing, it can be appreciated that a number of embodiments, preferred and alternative, are disclosed herein. For example, in one embodiment, a method can be implemented for detecting anomalies in transportation related video footage. Such a method can include the steps or logical operations of, for example: in an offline training phase, receiving video footage at a traffic location; in an offline training phase, extracting event encodings from the video footage and collecting the event encodings into a training dictionary; in an online detection phase, receiving at least one input video sequence captured at the traffic location or a similar traffic location; extracting an event encoding corresponding to input video sequence; reconstructing the event encoding with a low rank sparsity prior model applied with respect to the training dictionary; and computing a reconstruction error between actual and reconstructed event encodings in order to determine if an event thereof is anomalous by comparing the reconstruction error with a threshold.

In another embodiment, a system for detecting anomalies in transportation related video footage can be implemented. Such a system can include, for example, a processor and a computer-usable medium embodying computer program code, the computer-usable medium capable of communicating with the processor. The computer program code can include instructions executable by the processor and configured for: in an offline training phase, receiving video footage at a traffic location; in an offline training phase, extracting event encodings from the video footage and collecting the event encodings into a training dictionary; in an online detection phase, receiving at least one input video sequence captured at the traffic location or a similar traffic location; extracting an event encoding corresponding to the input video sequence; reconstructing the event encoding with a low rank sparsity prior model applied with respect to the training dictionary; and computing a reconstruction error between actual and reconstructed event encodings in order to determine if an event thereof is anomalous by comparing the reconstruction error with a threshold.

In another embodiment, a processor-readable medium storing computer code representing instructions to cause a process for detecting anomalies in transportation related video footage can be implemented. Such computer code can further include code to, for example, in an offline training phase, receive video footage at a traffic location; in an offline training phase, extract event encodings from the video footage and collecting the event encodings into a training dictionary; in an online detection phase, receive at least one input video sequence captured at the traffic location or a similar traffic location; extract an event encoding corresponding to the input video sequence; reconstruct the event encoding with a low rank sparsity prior model applied with respect to the training dictionary; and compute a reconstruction error between actual and reconstructed event encodings in order to determine if an event thereof is anomalous by comparing the reconstruction error with a threshold.

It will be appreciated that variations of the above-disclosed and other features and functions, or alternatives thereof, may be desirably combined into many other different systems or applications. It will also be appreciated, that various presently unforeseen or unanticipated alternatives, modifications, variations or improvements therein may be subsequently made by those skilled in the art, which are also intended to be encompassed by the following claims.

The invention claimed is:

1. A method for detecting anomalies in transportation related video footage, said method comprising:
   in an offline training phase, receiving video footage at a traffic location;
   in an offline training phase, extracting event encodings from said video footage received at said traffic location and collecting said event encodings into a training dictionary;
   in an online detection phase, receiving at least one input video sequence captured at said traffic location or a similar traffic location;
   extracting an event encoding corresponding to said at least one input video sequence;
   reconstructing said event encoding with a low rank sparsity prior model applied with respect to said training dictionary; and
   computing a reconstruction error between actual and reconstructed event encodings in order to determine if an event thereof is anomalous by comparing said reconstruction error with a threshold, wherein said computing said reconstruction error between said actual and reconstructed event encodings and determining if said event is anomalous includes asserting that said event is normal if the following test holds true:

$$\frac{\|y_i - \hat{y}_i\|_2}{\|y_i\|_2} < \tau \rightarrow y_i$$

wherein said y comprises a true event encoding, $\hat{y}_i$ comprises a reconstructed event encoding, and $\tau$ comprises a predetermined threshold.

2. The method of claim 1 wherein said event encoding comprises a trajectory of a moving object.

3. The method of claim 1 wherein said event encoding is based on spatiotemporal volume.

4. The method of claim 3 wherein reconstructing said event encoding further comprises computing with the following expression $\hat{y}_i = A\hat{s}_i$ wherein $\hat{s}_i$ comprises a solution to a constrained convex optimization problem, and $\hat{y}_i$ comprises a reconstructed event encoding.

5. The method of 4 further comprising solving said constrained convex optimization problem via semi-definite programming.

6. The method of claim 1 wherein reconstructing said event encoding with said low rank sparsity prior model further comprises solving a constrained convex optimization problem in order to simultaneously minimize a rank and maximize sparsity of a reconstruction coefficient matrix subject to a constraint on reconstruction error.

7. The method of claim 6 further comprising solving the following problem:

minimize $\|S\|_*+\lambda\|S\|_1$ subject to $\|Y-AS\|_F \leq \epsilon$ wherein S is a reconstruction coefficient matrix, Y is a matrix of input event encodings $y_i$, A is the training dictionary, $\|S\|_*$ is the nuclear norm of S, $\|S\|_1$ is the L-1 norm of S, $\|\ \|_F$ is the Frobenius norm of a matrix, l is a regularization parameter, and e is a predetermined threshold.

8. The method of claim 1 wherein said training dictionary comprises a plurality of event encodings, wherein each event encoding among said plurality of event encodings corresponds to at least one multiple object.

9. A system for detecting anomalies in transportation related video footage, said system comprising:
- a processor; and
- a non-transitory computer-usable medium embodying computer program code, said non-transitory computer-usable medium capable of communicating with said processor, said computer program code comprising instructions executable by said processor and configured for:
  - in an offline training phase, receiving video footage at a traffic location;
  - in an offline training phase, extracting event encodings from said video footage received at said traffic location and collecting said event encodings into a training dictionary;
  - in an online detection phase, receiving at least one input video sequence captured at said traffic location or a similar traffic location;
  - extracting an event encoding corresponding to said at least one input video sequence;
  - reconstructing said event encoding with a low rank sparsity prior model applied with respect to said training dictionary; and
  - computing a reconstruction error between actual and reconstructed event encodings in order to determine if an event thereof is anomalous by comparing said reconstruction error with a threshold, wherein said computing said reconstruction error between said actual and reconstructed event encodings and determining if said event is anomalous includes asserting that said event is normal if the following test holds true:

$$\frac{\|y_i - \hat{y}_i\|_2}{\|y_i\|_2} < \tau \rightarrow y_i$$

wherein said y comprises a true event encoding, $\hat{y}_i$ comprises a reconstructed event encoding, and $\tau$ comprises a predetermined threshold.

10. The system of claim 9 wherein said event encoding comprises a trajectory of a moving object.

11. The system of claim 9 wherein said event encoding is based on spatiotemporal volume.

12. The system of claim 9 wherein said instructions for reconstructing said event encoding with said low rank sparsity prior model, further comprises instructions configured for solving a constrained convex optimization problem in order to simultaneously minimize a rank and maximize sparsity of a reconstruction coefficient matrix subject to a constraint on reconstruction error.

13. The system of claim 12 wherein said instructions are further configured for solving the following problem:

$$\text{minimize } \|S\|_* + \lambda \|S\|_1$$

$$\text{subject to } \|Y - AS\|_F < \epsilon$$

wherein S is a reconstruction coefficient matrix, Y is a matrix of input event encodings $y_i$, A is the training dictionary, $\|S\|_*$ is the nuclear norm of S, $\|S\|_1$ is the L-1 norm of S, $\|\ \|_F$ is the Frobenius norm of a matrix, l is a regularization parameter, and e is a predetermined threshold.

14. The system of claim 12 wherein reconstructing said event encoding further comprises computing with the following expression $\hat{y}_i = A\hat{s}_i$ wherein $\hat{s}_i$ comprises a solution to a constrained convex optimization problem, and $\hat{y}_i$ comprises a reconstructed event encoding.

15. The system of 14 wherein said instructions are further configured for solving said constrained convex optimization problem via semi-definite programming.

16. The system of claim 9 wherein said training dictionary comprises a plurality of event encodings, wherein each event encoding among said plurality of event encodings corresponds to at least one multiple object.

17. A non-transitory processor-readable medium storing computer code representing instructions to cause a process for detecting anomalies in transportation related video footage, said computer code further comprising code to:
- in an offline training phase, receive video footage at a traffic location;
- in an offline training phase, extract event encodings from said video footage received at said traffic location and collecting said event encodings into a training dictionary;
- in an online detection phase, receive at least one input video sequence captured at said traffic location or a similar traffic location;
- extract an event encoding corresponding to said at least one input video sequence;
- reconstruct said event encoding with a low rank sparsity prior model applied with respect to said training dictionary; and
- compute a reconstruction error between actual and reconstructed event encodings in order to determine if an event thereof is anomalous by comparing said reconstruction error with a threshold, wherein said computing said reconstruction error between said actual and reconstructed event encodings and determining if said event is anomalous includes asserting that said event is normal if the following test holds true:

$$\frac{\|y_i - \hat{y}_i\|_2}{\|y_i\|_2} < \tau \rightarrow y_i$$

wherein said y comprises a true event encoding, $\hat{y}_i$ comprises a reconstructed event encoding, and r comprises a predetermined threshold.

18. The non-transitory processor-readable medium of claim 17 wherein:
- said event encoding comprises a trajectory of a moving object;
- said event encoding is based on spatiotemporal volume.

* * * * *